Patented Dec. 16, 1947

2,432,556

UNITED STATES PATENT OFFICE 2,432,556

PREPARATION OF TERPENE ALCOHOLS

Joseph N. Borglin, Wilmington, Del., assignor to Hercules Powder Company, Wilmington, Del., a corporation of Delaware No Drawing. Application September 11, 1944, Serial No. 553,674

11 Claims. (Cl. 260—631.5)

This invention relates to an improved process for the manufacture of terpene alcohols, and more particularly, it relates to an improvement in hydrating an unsaturated bicyclic terpene hydrocarbon by the use of sulfamic acid as a catalyst.

Terpene alcohols have been prepared heretofore by the reaction of turpentine with water in the presence of sulfuric acid, phosphoric acid, benzene sulfonic acid, toluene sulfonic acid, methyl sulfuric acid, or ethyl sulfuric acid as a catalyst. Generally when hydrating turpentine in the presence of these catalysts, a mixture of terpene alcohols, monocyclic terpene hydrocarbons, and terpin hydrate is obtained. It is desirable to get as large a proportion of terpene alcohol as possible, the monocyclic terpenes and terpin hydrate being by-products having limited utility. Now, in accordance with this invention, when sulfamic acid is used as a catalyst in the hydration of turpentine, the ratio of terpene alcohols to monocyclic terpene hydrocarbons is increased over that obtained using previously known catalysts. For example, the ratio of terpene alcohols to monocyclic terpene hydrocarbons is increased about 100% over the ratio obtained when sulfuric acid is used as a catalyst.

In accordance with this invention, the hydration of a bicyclic unsaturated terpene, such as a pinene, is brought about by heating a mixture of the terpene and water in the presence of sulfamic acid. Addition of an emulsifying agent to the mixture speeds up the reaction. Instead of using sulfamic acid alone as the catalyst, a mixture of sulfamic acid and sulfuric acid may be used in the presence of an inert solvent, such as acetone.

The method in accordance with this invention is illustrated by the following specific examples. Parts and percentages are by volume unless otherwise specified.

Example 1

A mixture of 2000 cc. gum turpentine, 1600 g. water, 400 g. sulfamic acid, and 1 g. "Emulgor A" (emulsifying agent) was efficiently agitated at a temperature of 68–70° C. for a period of 15 hours. The specific gravity of the oil layer rose to 0.8999. The oil layer was neutralized. Fractionation of the oil gave the following yields:

|  | Per cent |
|---|---|
| Unreacted turpentine | 40.4 |
| Monocyclic terpene hydrocarbons | [1] 15.9 |
| Terpene alcohol fraction | [2] 41.4 |
| Residue | 2.3 |

[1] 26.6% of reacted turpentine.
[2] 69.5% of reacted turpentine.

The terpene alcohol fraction contains terpineols, isoborneols, and small amounts of fenchyl alcohol.

Analysis of the terpene alcohol fraction gave the following results:

| Boiling point | °C | 214–221 |
|---|---|---|
| Specific gravity | | 0.9407 |
| Refractive index | | 1.4833 |
| Specific rotation | degrees | −11.5 |
| Total alcohol | per cent | 99 |

Example 2

Example 1 was repeated using alpha-pinene in place of turpentine. The following yields expressed as per cent of reacted pinene were obtained:

|  | Per cent |
|---|---|
| Monocyclic terpene hydrocarbons | 24.4 |
| Terpene alcohol fraction | 70.0 |
| Terpin hydrate | 5.6 |

Example 3

Example 1 was repeated using beta-pinene in place of turpentine. The following yields expressed as per cent of reacted pinene were obtained:

|  | Per cent |
|---|---|
| Monocyclic terpene hydrocarbons | 22.5 |
| Terpene alcohol fraction | 72.3 |
| Terpin hydrate | 5.2 |

Example 4

A mixture of 2000 cc. gum turpentine, 800 g. water, 200 g. sulfamic acid, 200 g. 95% sulfuric acid and 800 g. acetone was agitated efficiently at a temperature of 51–53° C. for 17 hours. The oil layer had a specific gravity of 0.9029. The oil layer was separated and neutralized. Analysis by fractionation gave the following results:

|  | Per cent |
|---|---|
| Unreacted turpentine | 9.1 |
| Monocyclic terpene hydrocarbons | [1] 18.3 |
| Terpene alcohol fraction | [2] 67.8 |
| Terpin hydrate | 4.8 |

[1] 20.2% of reacted turpentine.
[2] 74.5% of reacted turpentine.

Example 5

Example 4 was repeated using alpha-pinene in place of turpentine. The following yields expressed as per cent of reacted pinene were obtained:

|  | Per cent |
|---|---|
| Monocyclic terpene hydrocarbons | 23.9 |
| Terpene alcohol fraction | 73.0 |
| Terpin hydrate | 3.1 |

Example 6

Example 4 was repeated using beta-pinene in place of turpentine. The following yields expressed as per cent of reacted pinene were obtained:

|  | Per cent |
|---|---|
| Monocyclic terpene hydrocarbons | 24.5 |
| Terpene alcohol fraction | 71.5 |
| Terpin hydrate | 4.0 |

In accordance with this invention, a bicyclic unsaturated terpene and water are reacted to form terpene alcohols by heating the reactants in the presence of sulfamic acid at a temperature between about 40° C. and about 90° C. After the reaction between the terpene and water is substantially complete, the oil layer is separated from the aqueous layer. The oil layer is then neutralized and fractionally distilled. The unreacted terpene, the monocyclic terpene hydrocarbons, and the terpene alcohols are obtained as separate fractions. The terpene alcohols obtained include the terpineols, isoborneol and fenchyl alcohol.

The hydration of turpentine in the presence of sulfamic acid may be brought about by heating the reaction mixture at a temperature between about 40° C. and about 90° C. for a period of time of about 10 to about 48 hours. It is preferred to use a temperature between about 50° C. and about 80° C., and a period of time of about 15 to about 20 hours. At a temperature below 40° C. the reaction is extremely slow.

The amount of water used in the reaction mixture may be varied from about 10% to about 200% of the amount of terpene, preferably from about 20% to about 100%. The concentration of sulfamic acid used may be varied over a wide range, but will desirably be within the range of about 5% to about 40% of the amount of terpene used. In general, it is preferred to have the catalyst within the range of about 15% to about 30% of the terpene. The emulsifying agent may be used in amounts up to about 5% of the amount of terpene.

If sulfamic acid is used alone, it is desirable to add an emulsifying agent to bring the catalyst into closer contact with the terpene. The reaction takes place more rapidly in the presence of an emulsifier. Suitable emulsifying agents are the diethylene glycol esters of fatty acids (e. g., "Emulgor A," which is sold by Glyco Products Company, Inc.) the dialkyl esters of sodium sulfosuccinic acid, the sodium alkyl aryl sulfonates, etc.

Instead of using sulfamic acid alone, a mixture of sulfamic acid and sulfuric acid may be used as the catalyst in the presence of an inert solvent. The mixed catalyst should contain at least 1 part of sulfamic acid to 10 parts of sulfuric acid and preferably contains approximately equal quantities of the two acids. The inert solvent used should be partially or completely miscible with the terpene. Suitable solvents include acetone, dioxane, diethyl ketone, and methyl ethyl ketone. The amount of inert solvent used may vary widely, but usually it is preferred to use not more than about 50% of the amount of terpene used.

The terpene hydrocarbons which may be used in accordance with this invention are bicyclic unsaturated terpenes, such as alpha-pinene and beta-pinene. The terpene compounds used need not be in the form of pure compounds to be treated in accordance with this invention, but may be reacted in crude forms. Thus, in place of pure pinene, crude mixtures such as wood turpentine, gum turpentine, and sulfate turpentine may be used.

It has been found that when sulfamic acid is used as a catalyst in the preparation of terpene alcohols, larger yields are obtained than when using sulfuric acid as a catalyst. Thus, when turpentine is hydrated in the presence of sulfuric acid using acetone as a solvent, the product contains about 55 to 60% terpene alcohols and about 35 to 40% monocyclic terpene hydrocarbons on the basic of reacted turpentine or a ratio of terpene alcohols to terpene hydrocarbons of between about 1.4 and 1.7. However, when sulfamic acid is used as the catalyst in the hydration of turpentine, the product contains about 65 to 75% terpene alcohols and about 20 to 25% monocyclic terpene hydrocarbons on the reacted turpentine basic or a ratio of terpene alcohols to monocyclic terpene hydrocarbons between about 2.6 and 3.8. Thus, by using sulfamic acid as a catalyst, the ratio of terpene alcohols to monocyclic terpene hydrocarbons is approximately twice that obtained using sulfuric acid as a catalyst.

What I claim and desire to protect by Letters Patent is:

1. The method of producing a monohydric terpene alcohol which comprises reacting water with an unsaturated bicyclic terpene in the presence of sulfamic acid as a catalyst.

2. The method of producing a monohydric terpene alcohol which comprises reacting water with a pinene in the presence of sulfamic acid as a catalyst and an emulsifier.

3. The method of producing a monohydric terpene alcohol which comprises reacting water with alpha-pinene in the presence of sulfamic acid as a catalyst and an emulsifier at a temperature between about 40° C. and about 90° C.

4. The method of producing a monohydric terpene alcohol which comprises reacting water with beta-pinene in the presence of sulfamic acid as a catalyst and an emulsifier at a temperature between about 40° C. and about 90° C.

5. The method of producing a monohydric terpene alcohol which comprises reacting water with turpentine in the presence of sulfamic acid as a catalyst and an emulsifier at a temperature between about 40° C. and about 90° C.

6. The method of producing a monohydric terpene alcohol which comprises reacting water with a pinene in the presence of an inert solvent and a mixture of sulfamic acid and sulfuric acid as a catalyst.

7. The method of producing a monohydric terpene alcohol which comprises reacting water with alpha-pinene in the presence of acetone as a solvent and a mixture of sulfamic acid and sulfuric acid as a catalyst at a temperature between about 40° C. and about 90° C.

8. The method of producing a monohydric terpene alcohol which comprises reacting water with beta-pinene in the presence of acetone as a solvent and a mixture of sulfamic acid and sulfuric acid as a catalyst at a temperature between about 40° C. and about 90° C.

9. The method of producing a monohydric terpene alcohol which comprises reacting water with turpentine in the presence of acetone as a solvent and a mixture of sulfamic acid and sulfuric acid as a catalyst at a temperature between about 40° C. and about 90° C.

10. The method of producing terpineol which comprises reacting water with a pinene in the presence of sulfamic acid as a catalyst and an emulsifier.

11. The method of producing terpineol which comprises reacting water with a pinene in the presence of an inert solvent and a mixture of sulfamic acid and sulfuric acid as a catalyst.

JOSEPH N. BORGLIN.

REFERENCES CITED

The following references are of record in the file of this patent:

UNITED STATES PATENTS

| Number | Name | Date |
| --- | --- | --- |
| 1,408,462 | Marchand | Mar. 7, 1922 |
| 2,088,030 | Meuly | July 27, 1937 |
| 2,330,579 | Hasselstrom | Sept. 28, 1943 |

Certificate of Correction

Patent No. 2,432,556.  December 16, 1947.

JOSEPH N. BORGLIN

It is hereby certified that errors appear in the printed specification of the above numbered patent requiring correction as follows: Column 4, lines 14 and 21, for the word "basic" read *basis*; and that the said Letters Patent should be read with these corrections therein that the same may conform to the record of the case in the Patent Office.

Signed and sealed this 10th day of February, A. D. 1948.

[SEAL]

THOMAS F. MURPHY,
*Assistant Commissioner of Patents.*